United States Patent
Blomquist

(10) Patent No.: US 7,334,397 B2
(45) Date of Patent: Feb. 26, 2008

(54) REGULATION METHOD AND A DEVICE FOR EXHAUST GAS PURIFICATION

(75) Inventor: Micael Blomquist, Kvissleby (SE)

(73) Assignee: STT Emtec AB, Sundsvall (SE)

( * ) Notice: Subject to any disclaimer, the term of this patent is extended or adjusted under 35 U.S.C. 154(b) by 252 days.

(21) Appl. No.: 10/516,790

(22) PCT Filed: May 26, 2003

(86) PCT No.: PCT/SE03/00848

§ 371 (c)(1),
(2), (4) Date: Dec. 3, 2004

(87) PCT Pub. No.: WO03/102391

PCT Pub. Date: Dec. 11, 2003

(65) Prior Publication Data

US 2005/0172613 A1   Aug. 11, 2005

(30) Foreign Application Priority Data

Jun. 3, 2002 (SE) .................................... 0201647

(51) Int. Cl.
*F02M 25/06* (2006.01)
(52) U.S. Cl. ............................ 60/278; 60/274; 60/280; 60/287; 60/295; 60/605.2
(58) Field of Classification Search .................. 60/274, 60/278, 280, 285, 287, 295, 297, 311, 605.2
See application file for complete search history.

(56) References Cited

U.S. PATENT DOCUMENTS

| 4,835,963 | A | | 6/1989 | Hardy | |
|---|---|---|---|---|---|
| 5,771,868 | A | * | 6/1998 | Khair | 123/568.12 |
| 6,062,026 | A | * | 5/2000 | Woollenweber et al. | 60/605.2 |
| 6,338,245 | B1 | * | 1/2002 | Shimoda et al. | 60/285 |
| 6,594,990 | B2 | * | 7/2003 | Kuenstler et al. | 60/295 |
| 6,625,978 | B1 | * | 9/2003 | Eriksson et al. | 60/311 |
| 6,644,022 | B2 | * | 11/2003 | Hirota et al. | 60/297 |
| 6,666,020 | B2 | * | 12/2003 | Tonetti et al. | 60/286 |

(Continued)

FOREIGN PATENT DOCUMENTS

DE          19926138        12/2000

(Continued)

*Primary Examiner*—Binh Q. Tran
(74) *Attorney, Agent, or Firm*—Dilworth & Barrese LLP

(57) ABSTRACT

The invention relates to a device for purifying exhaust gases from a combustion engine (1), comprising an arrangement (30) for recirculating exhaust gases from the engine to an air intake (2) thereof, a valve device (12) controlled by a control device (13) for regulating the relation between fresh air and recirculated exhaust gases supplied to the engine, and a regenerable filter (8) adapted to catch particulate constituents of the exhaust gases. The device further comprises means (14) for recording the temperature of the exhaust gases from the engine. The control device (13) is adapted to be supplied with temperature information from said temperature recording means (14), the control device (13) being adapted, with the aid of this temperature information and the valve device (12), to regulate the relation between fresh air and recirculated exhaust gases supplied to the engine so as to achieve a composition of the exhaust gases from the engine that is favourable with respect to the regeneration of the filter (8).

20 Claims, 2 Drawing Sheets

U.S. PATENT DOCUMENTS 6,769,245 B2 * 8/2004 Itoh et al. ................. 60/295
6,816,771 B2 * 11/2004 Miura et al. .............. 701/102
6,981,370 B2 * 1/2006 Opris et al. ............... 60/311
7,104,051 B2 * 9/2006 Shimasaki et al. ........ 60/297
2001/0045090 A1 11/2001 Gray, Jr.

FOREIGN PATENT DOCUMENTS

GB 2229937 10/1990

* cited by examiner

REGULATION METHOD AND A DEVICE FOR EXHAUST GAS PURIFICATION

FIELD OF THE INVENTION AND PRIOR ART

The present invention relates to a device for purifying exhaust gases of a combustion engine according to the preamble of claim 1, and a method for regulating the relation between supplied fresh air and recirculated exhaust gases of a combustion engine according to the preamble of claim 8. The invention also relates to the use of the device for exhaust gas purification especially in a diesel engine.

It is known that EGR (Exhaust Gas Recirculation) is an advantageous purification method for reducing the proportion of hazardous exhaust gases, in particular nitrogen oxide ($NO_x$). In an EGR-system, a part of the exhaust gases from the engine is recirculated to the air intake thereof.

In particular with diesel engines, there exists the problem that a substantial amount of particulate constituents is generated. The expression particulate constituents includes particles as such, e.g. soot, and organic residues (denominated SOF) emanating from fuel and oil. It is known to use filters of various types for removing such particulate constituents from the exhaust gases. It is also known to design such filters as regenerating filters, i.e. so that they may be restored without exchange. Such regeneration is according to prior art for instance achieved by heating the filter to a required degree for combustion of the particulate constituents to occur. The energy requirements for such combustion is very large, wherefore the filter according to prior art has to be immobilised, either still connected to the engine or removed therefrom, so that the required heating may take place by connection of a heating element to an electric power network. This will consequently necessitate an interruption of operation.

Another technique of achieving a regeneration of a filter of the above-mentioned type is described in the patent document U.S. Pat. No. 4,902,487 A. According to this technique, a catalyst upstream of the filter is used, which catalyst is capable of converting a part of the NO naturally occurring in the exhaust gases into $NO_2$, which then reacts with the particulate constituents deposited on the filter. This gives rise to an automatic regeneration of the filter. Interruptions of operation are consequently avoided and no energy addition is required. A disadvantage with this system is however that a spontaneous regeneration with the utilisation of this method only will take place at a sufficiently high content of $NO_2$ in the exhaust gases from the engine. When the content of $NO_2$ in the exhaust gases that are passing through the filter is too low, which for instance often occurs at transient operating conditions with frequent changes in engine speed and load of the engine, a supplementary heat addition is required for a regeneration of the filter to take place.

The expression "supplementary heat addition" here refers to heat that is supplied to the filter by means of heat generating means in addition to the heat contents in the exhaust gases obtained by the combustion in the engine.

OBJECT OF THE INVENTION

The object of the present invention is to develop the prior art for the purpose of enabling an efficient filter regeneration also under transient operating conditions without requiring a supplementary heat addition.

SUMMARY OF THE INVENTION

According to the invention, said object is achieved by means of a device having the features defined in the characterising part of claim 1.

The inventive solution implies that the relation between fresh air and recirculated exhaust gases supplied to the engine is regulated in dependence on the temperature of the exhaust gases from the engine so as to achieve a composition of the exhaust gases from the engine that is favourable with respect to the regeneration of the filter. In the inventive device, it is consequently the exhaust gas composition that is adapted in dependence on the temperature and not the temperature that is adapted in dependence on the exhaust gas composition, as required according to the previously known technique. The composition of the exhaust gases from the engine is preferably regulated so that a regeneration of the filter can take place at the prevailing temperature level of the exhaust gases. Hereby, an efficient regeneration of the filter can be secured under widely differing operating conditions without any supplementary heat source or any supplementary heat generating means having to be installed, which implies lower installation costs and increased reliability in operation. It is however also possible to regulate the composition of the exhaust gases from the engine so that the soot contents in the exhaust gases are low when the recorded exhaust gas temperature is so low that no ignition and combustion of soot deposited in the filter can occur and high when the recorded exhaust gas temperature is so high that ignition and combustion of soot deposited in the filter can take place. Hereby, clogging of the filter at low exhaust gas temperatures is prevented.

Preferred embodiments of the inventive device will appear from the dependent claims and the subsequent description.

The invention also relates to a method according to the subsequent claim 8 and the use of the inventive device according to the subsequent claim 11.

BRIEF DESCRIPTION OF THE DRAWINGS

The invention will in the following be more closely described by means of embodiment examples, with reference to the appended drawings. It is shown in.

DETAILED DESCRIPTION OF PREFERRED EMBODIMENTS

Figure 1:
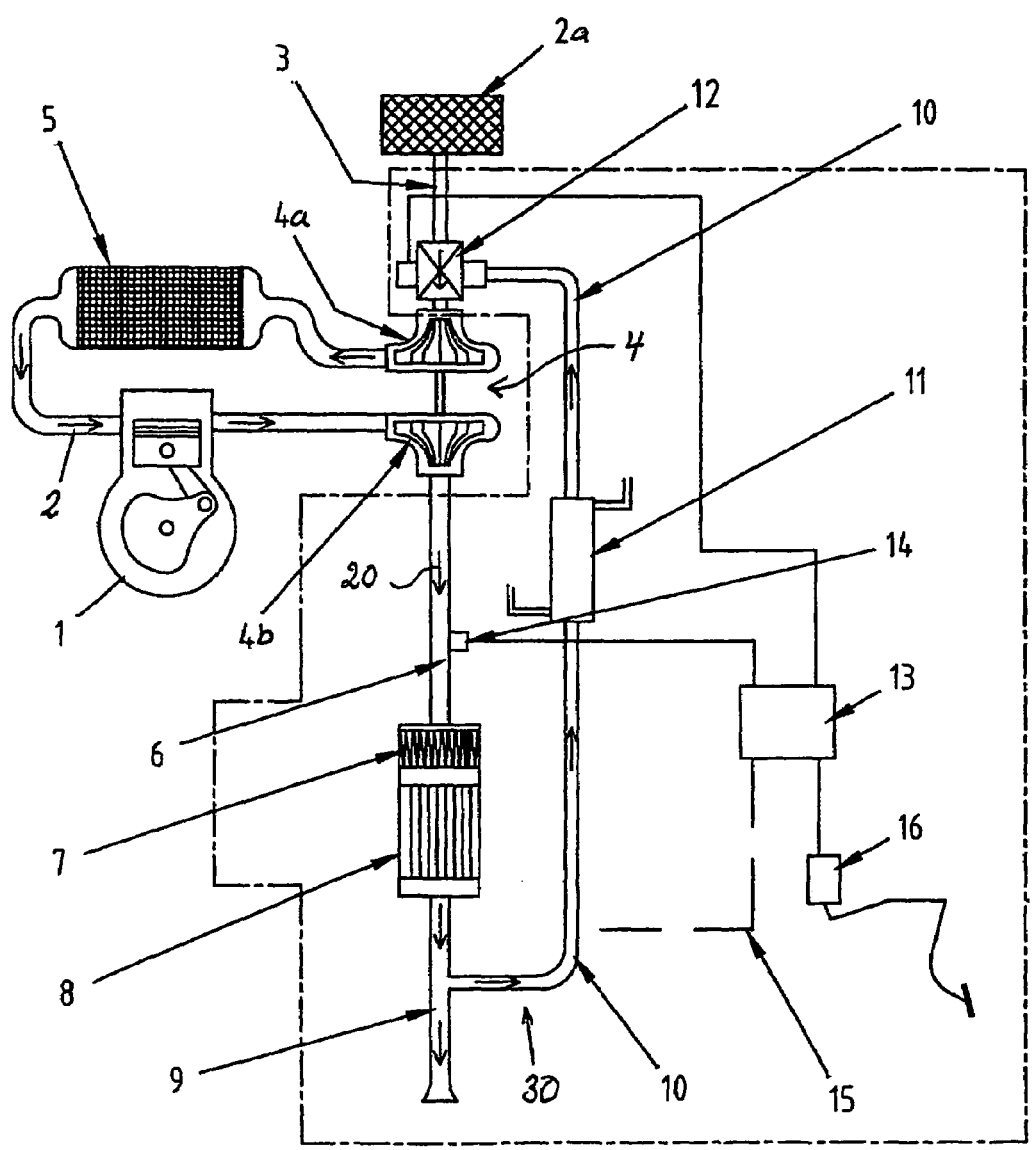
FIG. 1 a principle drawing showing a combustion engine with an associated EGR-system, illustrating an embodiment of the inventive device, and FIG. 2 a diagram illustrating an example of a required relation between $NO_x$ and soot at different exhaust gas temperatures in order to achieve a regeneration of a particle filter.

FIG. 1 schematically illustrates a combustion engine provided with a device according to an embodiment of the invention. The combustion engine is schematically indicated at 1. Air is taken to the engine via an air intake 2, adjacent to which an air filter 2a may be provided. The air is directed through an inlet air channel, generally denoted 3, towards the combustion chambers of the engine. It is already here pointed out that the present invention is applicable to engines operating only by suction, i.e. where the air transport into the combustion chambers of the engine is generated by suction due to piston movements in the engine. However, the invention is also applicable to supercharging, i.e. forced air supply to the engine, which generally can be accomplished by means of a compressor. Such a compressor may be driven in an arbitrary manner, e.g. mechanically via the engine or suitable auxiliary equipment, or as indicated in FIG. 1, by means of the exhaust gas flow from the engine. Thus, the device comprises in the example a turbo charger 4, which comprises a compressor wheel 4a for feeding the air to the engine with over-pressure and a turbine wheel 4b placed so as to be put into rotation by activation of exhaust gases leaving the engine. The compressor wheel 4a and the turbine wheel 4b are operationally coupled to each other, e.g. by being placed on one and the same shaft. As is usual in supercharging, the air may, after having been imparted to over-pressure, be subjected to cooling in a charging air cooler 5 (intercooler). The exhaust gases exiting the engine move in an exhaust conduit 6 and enter into the surroundings via an exhaust gas outlet 9.

As will be described in more detail in the following, the device comprises an arrangement, generally denoted with 30, for recirculating exhaust gases from the engine to the air intake 2 of the engine. For this purpose, a recirculation conduit, denoted 10, is provided. In the example, this recirculation condition connects to the inlet air channel denoted with 3. If so desired, the recirculation conduit 10 may pass through a cooler 11 so as to cool the recirculated exhaust gases. The conduit 10 is connected to the inlet air channel 3 via a valve device 12, which is controllable by means of an EGR control device 13. The valve device 12 may, with the aid of the EGR control device 13, regulate the relation between the supplied amount of fresh air from the inlet air channel 3 and the supplied amount of recirculated exhaust gases from the recirculation conduit 10. This mixture adjusted by means of the valve 12 can, accordingly, be supplied to the air intake 2 of the engine.

The control device 13, which controls the valve device 12, is supplied with information about the actual state of operation of the engine for instance from a sensor 15 for engine speed and a sensor 16 for throttle position. The control device 13 is programmed to control the valve device 12 and thereby the mixing relation fresh air/exhaust gases for the purpose of minimising the contents of hazardous substances that are leaving the exhaust gas outlet 9 and are released into the free air. The programming of the control device 13 is carried out in a manner known per se so as to achieve a favourable correlation between the various factors mentioned above.

The valve device 12 could of course comprise separate valves in the inlet air channel 3 and in the recirculation conduit 10, which valves then would be separately controllable by the control device 13. Alternatively, the valve device 12 may also comprise a unit in which flows from the inlet air channel 3 and the recirculation conduit 10, by means of valves included in the valve device, selectively may be combined into a common output flow that is conducted further towards the air intake 2 of the engine.

The inventive device further comprises a filter of regenerable type, generally denoted with 8, adapted to catch particulate constituents of the exhaust gases. This filter 8 is here arranged in the exhaust conduit. The inventive device could instead for or in combination with a filter arranged in the exhaust conduit 6 comprise a particle filter of regenerable type arranged in the recirculation conduit.

The filter 8 is of the type having its regeneration based on temperature dependent processes, the filter 8 being designed so that its regeneration is promoted by chemical reactions involving substances occurring in the exhaust gases. The regeneration of the filter is consequently dependent partly on the temperature of the exhaust gases from the engine and partly on the composition of these exhaust gases.

The chemical reactions that promote the regeneration of the filter may for instance be promoted by means of catalytic material integrated in the filter 8, by means of a catalyst 7 arranged upstream of the filter or by means of the combination of catalytic material integrated in the filter 8 and a catalyst 7 arranged upstream of the filter.

The inventive device further comprises means, preferably in the form of one or several temperature sensors 14, for recording the temperature of the exhaust gases from the engine. The EGR control device 13 is adapted to be supplied with temperature information from said temperature recording means 14 and the control device 13 is further adapted, with the aid of this temperature information and the valve device 12, to regulate the relation between fresh air and recirculated exhaust gases supplied to the engine so as to achieve a composition of the exhaust gases from the engine that is favourable with respect to the regeneration of the filter 8. According to the invention, the exhaust gas composition is consequently regulated by a regulation, by means of the valve device 12 and the control device 13, of the relation between fresh air and recirculated exhaust gases supplied to the engine. This regulation is adapted in the dependence on the recorded exhaust gas temperature preferably in such a way that the exhaust gases will get such a composition that a regeneration of the filter can be achieved at the presently prevailing temperature level of the exhaust gases.

By using temperature information from the temperature recording means 14, the EGR-system can not only be controlled for optimal reduction of $NO_x$-emissions but also be controlled for achieving the composition of the exhaust gases upstream of the filter 8 that is most favourable with respect to the regeneration processes in the filter 8 at each specific temperature condition.

The temperature recording means may comprise a temperature sensor 14 adapted to measure the temperature of the exhaust gases upstream of the filter 8, at the inlet of the filter, inside the filter 8 or downstream of the filter 8.

The suitable exhaust gas composition, i.e. the suitable relation between supplied fresh air and recirculated exhaust gases, at different exhaust gas temperatures, for instance the exhaust gas composition required for achieving a regeneration of the filter at a specific exhaust gas temperature, may for instance be determined empirically.

In the inventive device, the control device 13 is preferably adapted, with the aid of said temperature information and the valve device 12, to regulate the relation between fresh air and recirculated exhaust gases supplied to the engine so as to achieve a relation between $NO_x$ and soot of the exhaust gases from the engine that is favourable for the regeneration of the filter 8. In this case, the device suitably comprises a means 7 for converting NO occurring in the exhaust gases into $NO_2$, which then reacts with the particulate constituents deposited on the filter 8. By an augmentation of the EGR-content, i.e. an augmentation of the relation between recirculated exhaust gases and supplied fresh air, a reduction of the $NO_x$/soot-relation of the exhaust gases is achieved, and by a reduction of the EGR-content, i.e. a reduction of the relation between recirculated exhaust gases and supplied fresh air, an augmentation of the $NO_x$/soot-relation of the exhaust gases is achieved.

Said converting means may consist of a catalyst 7 arranged upstream of the filter 8, which catalyst is capable of converting a part of the NO naturally occurring in the exhaust gases into $NO_2$. Alternatively, a catalytic material capable of converting NO into $NO_2$ may be integrated in the filter 8. This catalytic material is suitably integrated in the filter 8 by being arranged as a coating on the filter material included in the filter. When the exhaust gases pass through the filter 8 and get into contact with said catalytic material, a part of the NO-contents in the exhaust gases will be converted into $NO_2$. It is of course also possible to have said means for converting NO into $NO_2$ comprising a catalyst 7 arranged upstream of the filter as well as a catalytic material integrated in the filter 8.

At a sufficient temperature level and $NO_2$-content of the exhaust gases that pass through the filter 8, a reaction between $NO_2$ and particulate constituents deposited on the filter will occur, which will result in an ignition of the particulate constituents. In this way, a regeneration of the filter 8 will take place. Without such a regeneration, the filter would be clogged by caught particulate constituents, which in its turn would result in a deteriorated efficiency of the engine.

Figure 2:
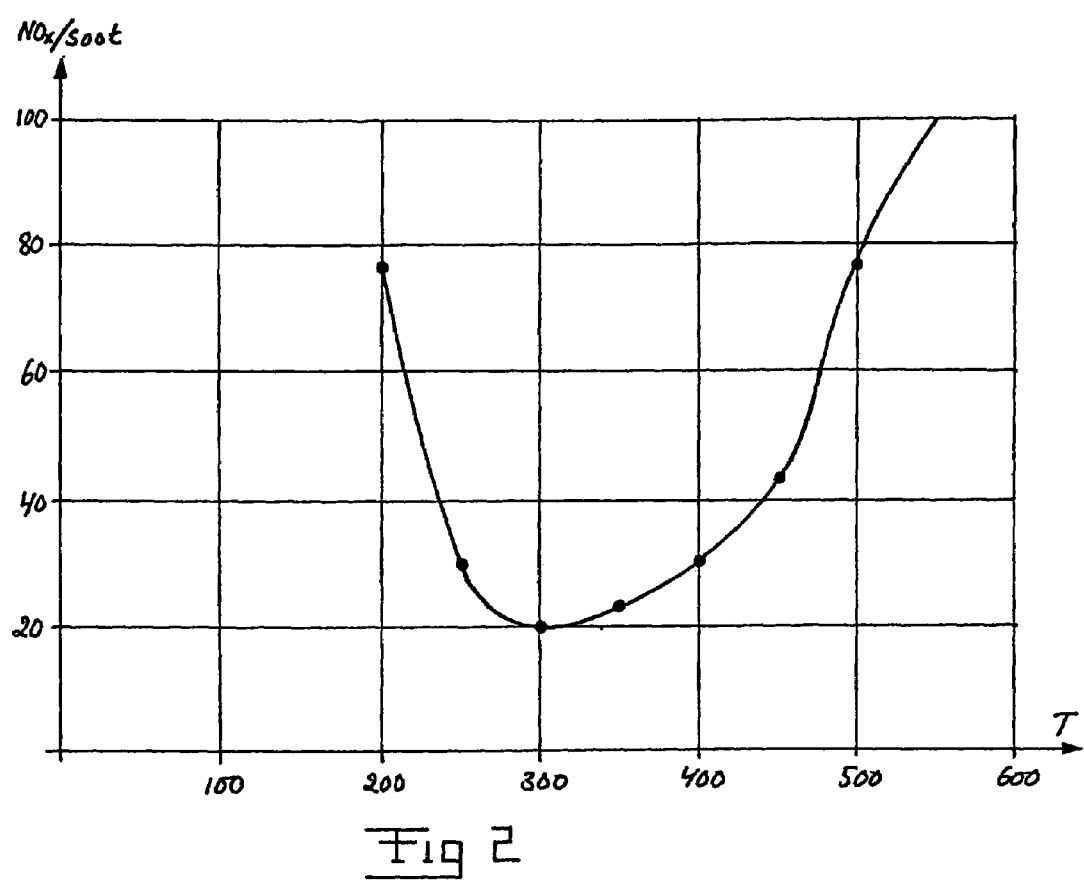

FIG. 2 shows a diagram illustrating an example of the required relation between $NO_x$ and soot at different exhaust gas temperatures for achieving a regeneration of a certain particle filter. In this case, the required $NO_x$/soot-relation is reduced with increasing temperature of the exhaust gases up to about 300° C. At an exhaust gas temperature of about 300° C., the required $NO_x$/soot-relation is at the lowest. The required $NO_x$/soot-relation will then increase with increasing temperature of the exhaust gases when the exhaust gas temperature exceeds about 300° C.

The catalyst structure of the catalyst 7 is suitably designed in such a way that a suitable large-surfaced base material, for instance a ceramic honeycomb structure, is coated with the proper catalyst material, for instance a precious metal. The catalytic material of the catalyst 7 and/or the catalytic material of the filter 8 that achieves conversion of NO into $NO_2$ suitably comprises a platinum-group metal, preferably platinum (Pt).

The above-described device operates in the following manner: when the engine is running, exhaust gases arrive according to the arrow 20 to the catalyst 7 and the filter 8. The exhaust gases pass through the catalyst 7, where a part of the NO-contents of the exhaust gases is catalyticly converted into $NO_2$. After having passed the catalyst 7, the exhaust gases will continue into the filter 8 and will then be liberated from particulate constituents. The filter 8 is highly efficient for filtration purposes and is typically capable of removing more than 90% of the particulate constituents from the exhaust gases. These constituents are deposited on the filter material. The filter material will be heated as a consequence of the heat in the exhaust gases. This increased temperature is favourable for the regeneration of the filter, i.e. the combustion of the particulate constituents deposited therein. $NO_2$ carried by the exhaust gases to the filter reacts with particulate constituents deposited on the filter. This will, on condition that the $NO_x$/soot-relation of the exhaust gases is suitably adapted with respect to the prevailing exhaust gas temperature, give rise to an automatic regeneration of the filter. By temperature detection, a target-oriented regulation of the $NO_x$/soot-relation to an optimum can be obtained. It is emphasised that a regeneration of the filter 8 may take place continuously as well as intermittently.

The invention has above been described in connection with a preferred application where the regulation of the relation between fresh air and recirculated exhaust gases supplied to the engine is adapted in dependence on the recorded exhaust gas temperature so that the exhaust gases will get such a composition that a regeneration of the filter is achieved at the presently prevailing temperature level of the exhaust gases. The invention is, however, also applicable in such cases where the fuel of the engine is supplied with an additive achieving a lowering of the temperature at which soot deposited in the filter is ignited and combusted, i.e. when using so-called "Fuel Born Catalyst". Said additive is for instance constituted by cerium or iron or mixtures based on these substances. In this case, the relation between fresh air and recirculated exhaust gases supplied to the engine is regulated so that the soot contents in the exhaust gases are reduced, i.e. the EGR-content is reduced, when the recorded exhaust gas temperature is so low that no ignition and combustion of soot deposited in the filter can take place. Hereby, the filter is prevented from being clogged. When the recorded exhaust gas temperature is so high that an ignition and combustion of soot deposited in the filter can take place, the EGR-content is increased, which implies that the soot contents of the exhaust gases are increased. In this case, the EGR-content is consequently regulated as a function of the recorded exhaust gas temperature so that the soot charge in the filter is kept at a suitable level.

The filter 8 comprises a filter material resistant to high temperatures and having a good filtering ability. As an example it may be mentioned that ceramic materials, mineral fibres and metallic fibres may be used. The chosen material must stand the high temperatures that may ensue during the regeneration of the filter.

According to a preferred embodiment of the invention, the filter 8 comprises a catalytic material capable of lowering the temperature at which particulate constituents deposited in the filter are ignited and combusted. This material may comprise silver vanadate, such as described in the patent document U.S. Pat. No. 4,455,393, or vanadium oxide, such as described in the patent document U.S. Pat. No. 4,902,487, or a mixture of a platinum-group metal and an alkaline earth metal, as described in the patent document EP 0160482 B1, or a mixture of lanthanum, caesium and vanadium pentoxide, as described in the patent document U.S. Pat. No. 4,902,487. Hereby, a further improvement of the conditions for the regeneration process in the filter is obtained.

The invention is especially advantageous with diesel engines and particularly with diesel engines of supercharged type. It is however emphasised that the invention also can be used with other types of engines. Furthermore, the invention works irrespective of the engine being supercharged or not, i.e. if the air supply to the engine is forced or generated by suction due to piston movements in the engine. If the engine in question would be supercharged, the exhaust gas recirculation conduit should be connected to the air inlet channel on the suction side of the supercharging unit, as illustrated in FIG. 1.

It is emphasised that the inventive device could be applied to the engine already in connection with the manufacturing thereof, but it is also possible to apply the device afterwards to an already used engine. An existing EGR-system only needs to be supplemented with a temperature sensor in order to make possible a realisation of the inventive solution.

The invention is of course not in any way restricted to the preferred embodiments described above, on the contrary many possibilities to modifications thereof should be apparent to a person skilled in the art without departing from the basic idea of the invention as defined in the appended claims.

The invention claimed is:

1. A device for purifying exhaust gases from a combustion engine (1), comprising an arrangement (30) for recirculating exhaust gases from the engine to an air intake (2) thereof, a valve device (12) controlled by a control device (13) for regulating the relation between fresh air and recirculated exhaust gases supplied to the engine, a regenerable filter (8) adapted to catch particulate constituents of the exhaust gases, and means (14) for recording the temperature of the exhaust gases from the engine, the control device (13) being adapted to be supplied with temperature information from said temperature recording means (14), wherein the control device (13) is adapted, with the aid of said temperature information and the valve device (12), to regulate the relation between fresh air and recirculated exhaust gases supplied to the engine to achieve a relation between $NO_x$ and soot of the exhaust gases from the engine that is favorable for regeneration of the filter (8).

2. A device according to claim 1, wherein the control device (13) is adapted, with the aid of said temperature information and the valve device (12), to regulate the relation between fresh air and recirculated exhaust gases supplied to the engine so that regeneration of the filter (8) will take place at prevailing temperature level of the exhaust gases.

3. A device according to claim 1, comprising means (7) for converting NO occurring in the exhaust gases into $NO_2$.

4. A device according to claim 3, wherein said converting means comprises a catalyst (7) for converting NO into $NO_2$, which is arranged upstream of the filter (8).

5. A device according to claim 3, wherein said converting means comprises a catalytic material for converting NO into $NO_2$, which material is integrated in the filter (8).

6. A device according to claim 1, wherein the filter (8) comprises a catalytic material for lowering the temperature at which particulate constituents deposited in the filter are ignited and combusted.

7. A method for regulating the relationship between supplied fresh air and recirculated exhaust gases of the combustion engine (1) which, comprises an arrangement (30) for recirculating exhaust gases from the engine to an air intake (2) thereof, a valve device (12) controlled by a control device (13) for regulating the relation between fresh air and recirculated exhaust gases supplied to the engine, and a regenerable filter (8) adapted to catch particulate constituents of the exhaust gases, the temperature of the exhaust gases from the engine being recorded and the control device (13) being supplied with information regarding said temperature, wherein the control device (13), with the aid of said temperature information and the valve device (12), regulates the relation between fresh air and recirculated exhaust gases supplied to the engine to achieve a relation between $NO_x$ and soot of the exhaust gases from the engine that is favorable for regeneration of the filter (8).

8. A method according to claim 7, wherein the control device (13), with the aid of said temperature information and the valve device (12), regulates the relation between fresh air and recirculated exhaust gases supplied to the engine so that a regeneration of the filter (8) will take place at the prevailing temperature level of the exhaust gases.

9. Use of a device according to claim 1 for purifying exhaust gases from a diesel engine.

10. A device according to claim 2, comprising means (7) for converting NO occurring in the exhaust gases into $NO_2$.

11. A device according to claim 10, wherein said converting means comprises a catalyst (7) for converting NO into $NO_2$, which is arranged upstream of the filter (8).

12. A device according to claim 11, wherein said converting means comprises a catalytic material for converting NO into $NO_2$, which material is integrated in the filter (8).

13. A device according to claim 4, wherein said converting means comprises a catalytic material for converting NO into $NO_2$, which material is integrated in the filter (8).

14. A device according to claim 2, wherein the filter (8) comprises a catalytic material for lowering the temperature at which particulate constituents deposited in the filter are ignited and combusted.

15. A device according to claim 3, wherein the filter (8) comprises a catalytic material for lowering the temperature at which particulate constituents deposited in the filter are ignited and combusted.

16. A device according to claim 4, wherein the filter (8) comprises a catalytic material for lowering the temperature at which particulate constituents deposited in the filter are ignited and combusted.

17. A device according to claim 5, wherein the filter (8) comprises a catalytic material for lowering the temperature at which particulate constituents deposited in the filter are ignited and combusted.

18. A device according to claim 10, wherein the filter (8) comprises a catalytic material for lowering the temperature at which particulate constituents deposited in the filter are ignited and combusted.

19. A device according to claim 11, wherein the filter (8) comprises a catalytic material for lowering the temperature at which particulate constituents deposited in the filter are ignited and combusted.

20. A device according to claim 12, wherein the filter (8) comprises a catalytic material for lowering the temperature at which particulate constituents deposited in the filter are ignited and combusted.

* * * * *